(12) United States Patent
Hashimoto et al.

(10) Patent No.: US 12,407,154 B2
(45) Date of Patent: Sep. 2, 2025

(54) PROTECTOR AND WIRE HARNESS

(71) Applicants: SUMITOMO WIRING SYSTEMS, LTD., Mie-ken (JP); TOYOTA JIDOSHA KABUSHIKI KAISHA, Aichi-ken (JP)

(72) Inventors: Kohei Hashimoto, Yokkaichi (JP); Hiroshi Inoue, Yokkaichi (JP); Takao Suga, Yokkaichi (JP); Takahiro Ito, Yokkaichi (JP); Hayate Takahashi, Yokkaichi (JP); Makoto Takahashi, Toyoake (JP); Kengo Satoh, Toyota (JP); Takuma Shimamura, Nisshin (JP); Yusuke Uchioka, Okazaki (JP)

(73) Assignees: SUMITOMO WIRING SYSTEMS, LTD., Mie-ken (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 413 days.

(21) Appl. No.: 17/905,331

(22) PCT Filed: Mar. 2, 2021

(86) PCT No.: PCT/JP2021/007933
§ 371 (c)(1),
(2) Date: Mar. 9, 2023

(87) PCT Pub. No.: WO2021/177295
PCT Pub. Date: Sep. 10, 2021

(65) Prior Publication Data
US 2023/0198235 A1 Jun. 22, 2023

(30) Foreign Application Priority Data
Mar. 2, 2020 (JP) .................. 2020-035094

(51) Int. Cl.
*H02G 3/04* (2006.01)
*B60R 16/02* (2006.01)
*H01B 7/18* (2006.01)

(52) U.S. Cl.
CPC .......... *H02G 3/04* (2013.01); *B60R 16/0215* (2013.01); *H01B 7/18* (2013.01)

(58) Field of Classification Search
CPC .......... H01B 7/0045; H01B 7/18; H02G 3/04; H02G 3/045; H02G 3/0406; H02G 3/0456

(Continued)

(56) References Cited

U.S. PATENT DOCUMENTS 2,917,259 A * 12/1959 Hill ............... H02G 3/0437
248/68.1
3,126,444 A * 3/1964 Taylor ............ H02G 3/0418
220/345.2

(Continued)

FOREIGN PATENT DOCUMENTS

| CN | 110649530 A | 1/2020 |
| CN | 210039719 U | 2/2020 |

(Continued)

*Primary Examiner* — William H. Mayo, III

(57) ABSTRACT

A protector includes a shell portion that is formed from a resin and covers an outer side of an electric wire and a protection portion that dampens an impact applied from outside the protector. The protection portion is formed from a resin and formed integrally with the shell portion.

6 Claims, 7 Drawing Sheets

(58) Field of Classification Search
USPC .... 174/48, 49, 68.1, 68.3, 70 R, 71 R, 72 A, 174/106 D, 480, 481; 138/118, 121, 172, 138/173
See application file for complete search history.

(56) References Cited

U.S. PATENT DOCUMENTS

| | | | | |
|---|---|---|---|---|
| 3,761,603 | A * | 9/1973 | Hays | H02G 3/0437 174/101 |
| 6,708,480 | B1 * | 3/2004 | Wehler | F16G 13/16 59/78.1 |
| 8,569,622 | B2 * | 10/2013 | Katou | H02G 3/0468 174/72 A |
| 8,704,093 | B2 * | 4/2014 | Asztalos | H02G 3/0406 138/155 |
| 11,837,855 | B2 * | 12/2023 | Oshino | B60R 16/0215 |
| 2013/0206928 | A1 * | 8/2013 | Murakoshi | F16L 3/1025 248/65 |
| 2015/0222101 | A1 * | 8/2015 | Kajiwara | H01B 7/0045 174/138 R |
| 2015/0274095 | A1 * | 10/2015 | Inao | H02G 3/0468 174/72 A |
| 2020/0358270 | A1 * | 11/2020 | Oshino | H02G 3/045 |
| 2021/0178993 | A1 * | 6/2021 | Murakami | H02G 3/0418 |

FOREIGN PATENT DOCUMENTS

| | | |
|---|---|---|
| JP | S54-144307 U | 10/1979 |
| JP | S55-038071 U | 3/1980 |
| JP | H10-201044 A | 7/1998 |
| JP | 2002-142326 A | 5/2002 |
| JP | 2003-197038 A | 7/2003 |
| JP | 2015-088397 A | 5/2015 |
| JP | 2016-081823 A | 5/2016 |

* cited by examiner

PROTECTOR AND WIRE HARNESS

TECHNICAL FIELD

The present disclosure relates to a protector and a wire harness.

BACKGROUND ART

A typical wire harness arranged in a vehicle may include an electric wire and a shell member that covers the electric wire. Patent Literature 1 describes an example of such type of a wire harness that further includes a protection member to protect the electric wire from an impact applied from outside the wire harness. In this case, the shell member and the protection member form a protector that protects the electric wire.

In the wire harness described in Patent Literature 1, the electric wire is accommodated in a groove of the protection member. Further, the wire, together with the protection member, is accommodated in a cover serving as a shell member that is disposed in part of an interior member of the vehicle.

CITATION LIST

Patent Literature

Patent Literature 1: Japanese Laid-Open Patent Publication No. 2002-142326

SUMMARY OF INVENTION

Technical Problem

The wire harness of Patent Literature 1 is assembled by attaching the electric wire to the protection member and then covering the protection member and the electric wire with the cover. To improve assembling workability, there is a demand for a reduction in the number of parts.

An objective of the present disclosure is to provide a protector and a wire harness that reduce the number of parts.

Solution to Problem

A protector according to the present disclosure includes a shell portion and a protection portion. The shell portion is formed from a resin and covers an outer side of an electric wire. The protection portion dampens an impact applied from outside the protector. The protection portion is formed from a resin and formed integrally with the shell portion.

A wire harness according to the present disclosure includes an electric wire and the above-described protector. The electric wire is electrically connected to an electric power supply that drives a power source for moving a vehicle. The protector includes the shell portion that covers the outer side of the electric wire.

Advantageous Effects of Invention

The protector and the wire harness according to the present disclosure reduces the number of parts.

DESCRIPTION OF EMBODIMENT

Description of Embodiment of Present Disclosure

Figure 1:
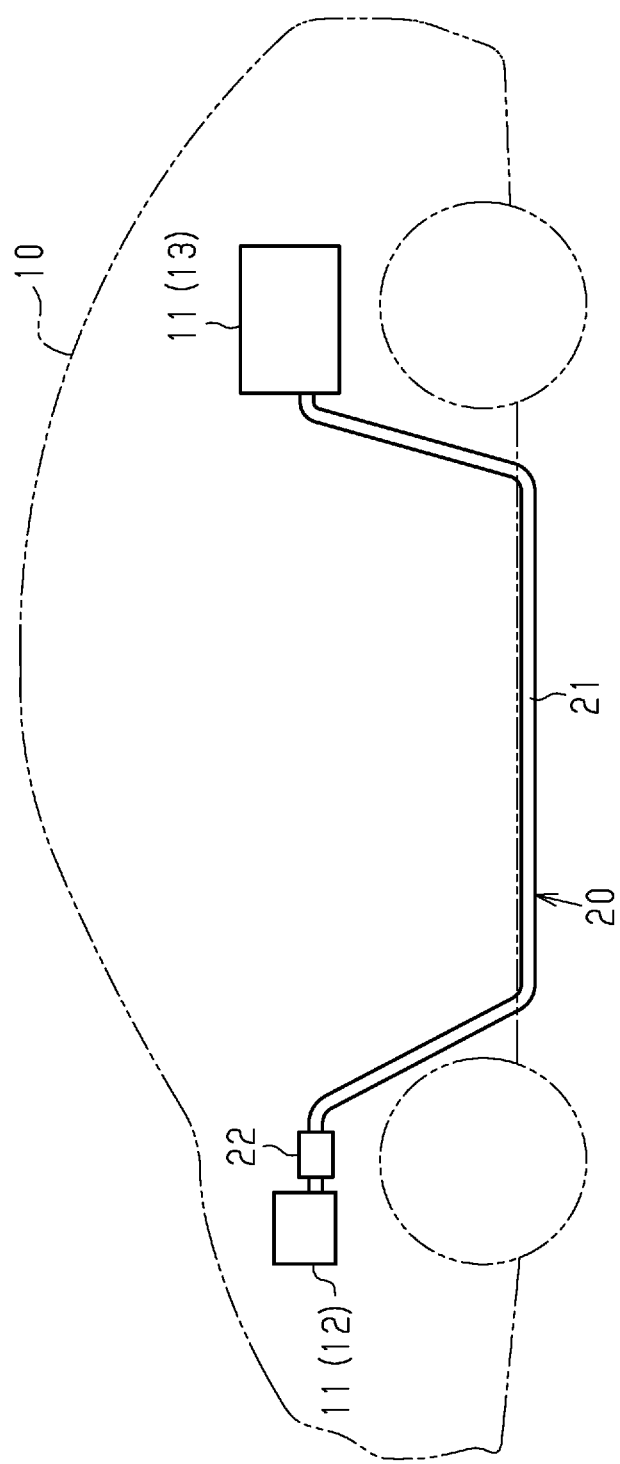
FIG. 1 is a schematic diagram showing a wire harness in accordance with an embodiment laid out in a vehicle.

An embodiment of the present disclosure will now be described.

A protector of the present disclosure is as follows.

(1) A protector including a shell portion and a protection portion. The shell portion is formed from a resin and covers an outer side of an electric wire. The protection portion dampens the impact applied from outside the protector. The protection portion is formed from a resin and formed integrally with the shell portion.

With the above structure, the protection portion dampens the impact applied from outside of the protection portion. This dampens the impact received by the electric wire. Further, the shell portion is formed integrally with the protection portion. Thus, the protector has fewer parts than a protector in which a shell portion and a protection portion are separate parts.

(2) Preferably, the protection portion includes cells extending parallel to one another.

With the above structure, the electric wire receives the impact dampened by the protection portion, which includes the parallel cells.

(3) Preferably, the protection portion disperses and absorbs the impact applied to the protection portion.

With the above structure, the protection portion disperses and absorbs the impact from outside the protector to dampen the impact received by the electric wire.

(4) Preferably, the shell portion is gutter-shaped and includes two opposing side walls and a bottom wall connecting an end of each of the two side walls. Preferably, the protection portion is integrated with an outer surface of the bottom wall. Preferably, the cells extend in an opposing direction of the two side walls.

The above structure limits the length of the cells. This facilitates manufacture of the protector with a mold.

(5) Preferably, the protection portion has a honeycomb structure in which the cells are hexagonal.

With the above structure, the protection portion further effectively dampens an impact.

(6) Preferably, a part of the bottom wall that is integrated with the protection portion is curved in an arcuate manner and bulged toward the protection portion in a cross section that is perpendicular to a direction in which the shell portion extends.

The above structure allows the protector to withstand a larger impact applied to the protection portion than when the part of the bottom wall integrated with the protection portion extends straight in a cross section that is perpendicular to the direction in which the shell portion extends.

(7) Preferably, the protection portion is integrated with a part of an outer surface of the shell portion. Preferably, the protection portion includes a flat side surface facing a side opposite to the shell portion and exposed to the outside.

With the above structure, when an object strikes the side surface of the protection portion, which is located at the side opposite to the shell portion, the force of the object will be applied to the protection portion in a direction perpendicular to the side surface.

A wire harness of the present disclosure is as follows.

(8) A wire harness including an electric wire and the above-described protector. The electric wire is electrically connected to an electric power supply that drives a power source for moving a vehicle. The protector includes the shell portion that covers the outer side of the electric wire.

With the above structure, the electric wire is connected to the electric power supply that drives a power source for moving the vehicle. Thus, a high voltage may be applied to the electric wire. The protector dampens the impact received by such an electric wire.

Detailed Description of Embodiment of Present Disclosure

A specific example of the protector and the wire harness in accordance with the present disclosure will now be described with reference to the drawings. The present invention is not limited to the illustrated examples and is intended to be defined by the claims and their equivalents, and all variations within the scope of the claims and their equivalents. In the appended drawings, elements may not be drawn to scale.

An embodiment of a protector and a wire harness will now be described.

Figure 2:
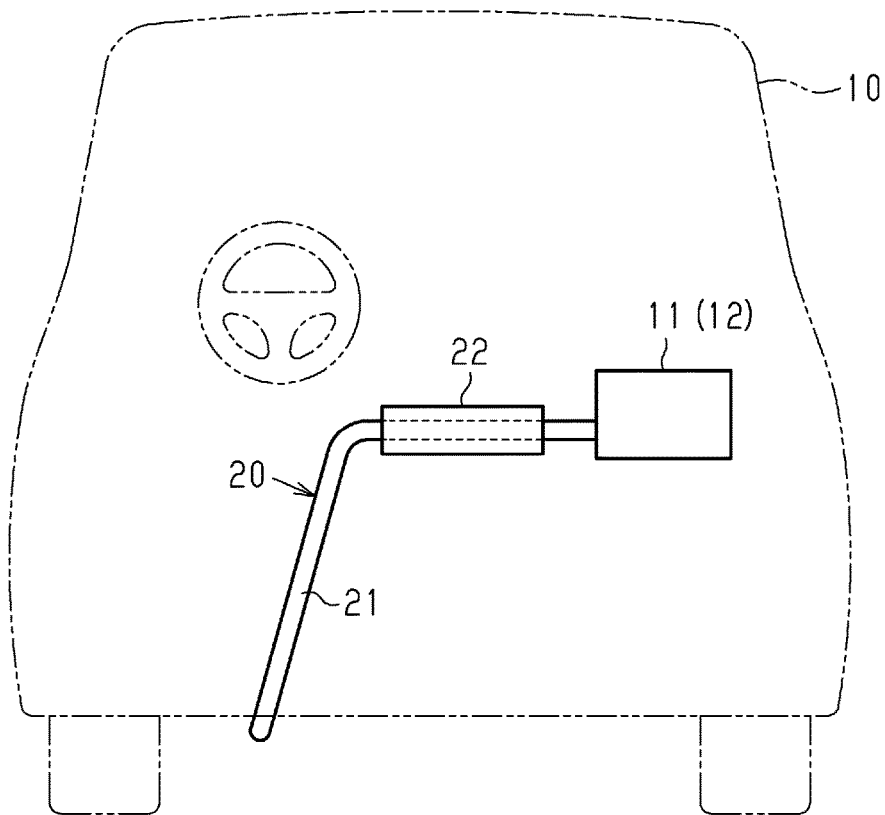
FIG. 2 is a schematic diagram showing the wire harness in accordance with the embodiment laid out in the vehicle.

As shown in FIGS. 1 and 2, a wire harness 20 electrically connects electric components 11 installed in a vehicle 10, such as a hybrid car or an electric vehicle. FIG. 1 shows only two of the electric components 11 arranged in the vehicle 10. FIG. 2 is a schematic diagram of the vehicle 10 as viewed from the front side. For example, at the front part of the vehicle 10, the wire harness 20 is laid out to extend from the right side to the left side of the vehicle 10. Further, the wire harness 20 extends under the floor of the vehicle 10 to the rear part of the vehicle 10.

Figure 3:
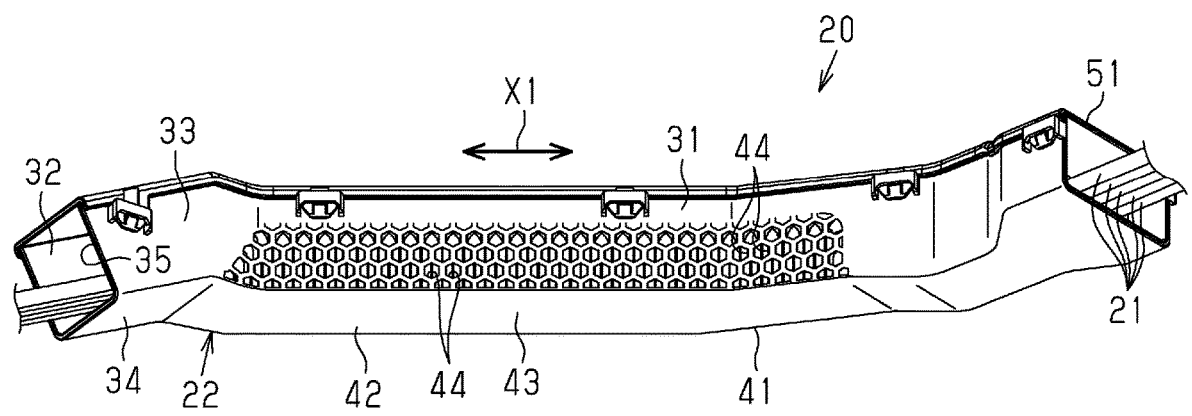
FIG. 3 is a perspective view of the wire harness in accordance with the embodiment.

As shown in FIG. 3, the wire harness 20 includes electric wires 21 and a protector 22 that covers the outer side of the electric wires 21. In the present embodiment, the wire harness 20 includes five electric wires 21. Each electric wire 21 electrically connects two electric components 11. For example, as shown in FIGS. 3 and 1, one of the electric wires 21 electrically connects an inverter 12 and a battery 13. The inverter 12 is located at the front part of the vehicle 10. The battery 13 is located toward the rear of the vehicle 10 from the inverter 12. The inverter 12 is connected to a wheel driving motor (not shown) serving as a power source for moving the vehicle. In other words, this single electric wire 21 is electrically connected to the battery 13 that is an electric power supply for driving the motor corresponding to a power source for moving the vehicle. The inverter 12 generates alternating current from direct current of the battery 13 and supplies the generated alternating current to the motor. The battery 13 is a battery capable of supplying, for example, a hundred to several hundreds of volts.

Structure of Protector 22

As shown in FIG. 3, the protector 22 includes a shell portion 31 and a protection portion 41. The shell portion 31 covers the outer side of the electric wires 21. The protection portion 41 dampens the impact applied from outside the protector 22. The protector 22 is formed from resin. The resin material of the protector 22 is, for example, polyamide or the like. The protection portion 41 is formed integrally with the shell portion 31. A mold for forming the protector 22 is filled with resin. Solidification of the resin forms the protector 22 with the protection portion 41 integrated with the shell portion 31.

Structure of Shell Portion 31

Figure 4:
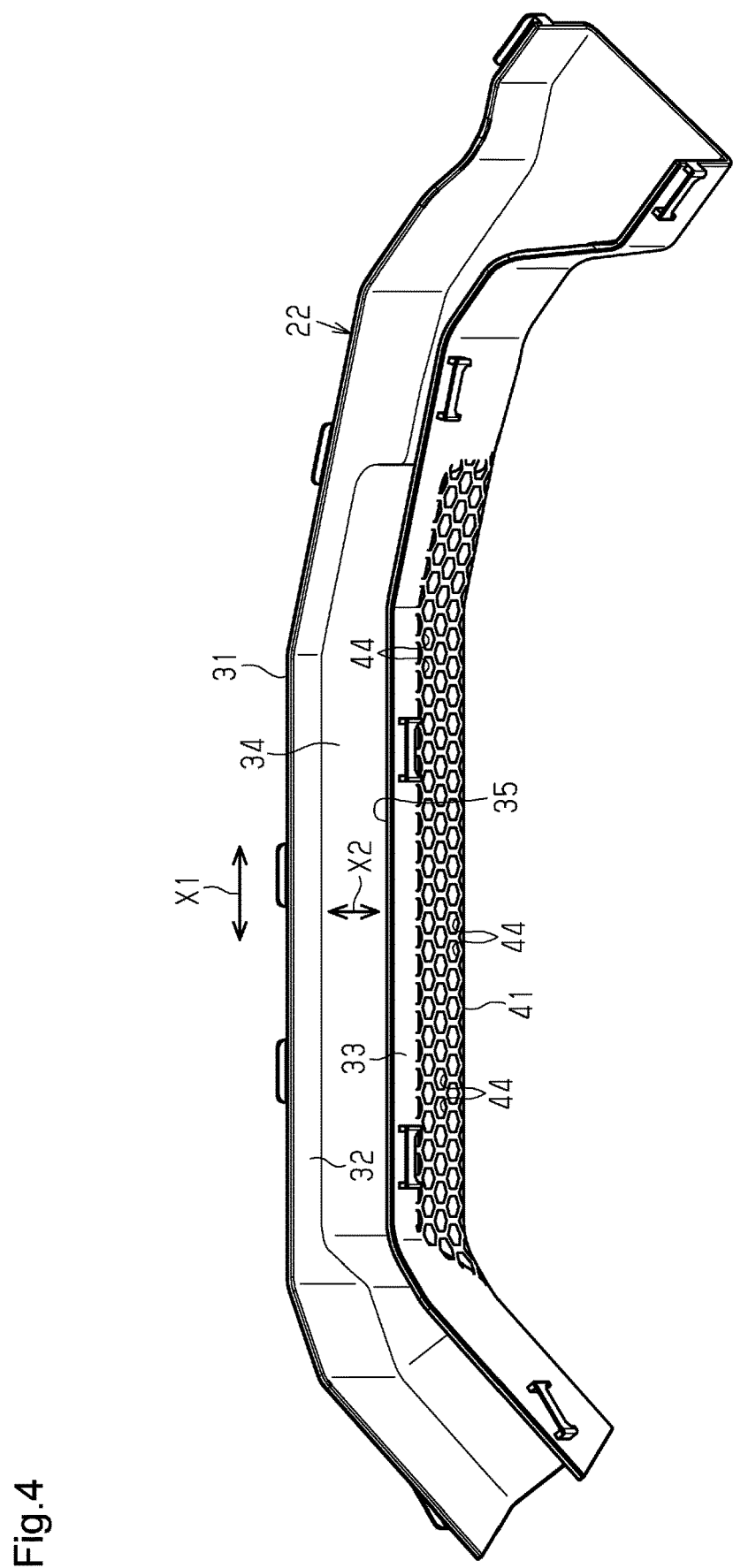
FIG. 4 is a perspective view of a protector in accordance with the embodiment.

As shown in FIG. 4, the shell portion 31 is gutter-shaped and includes two opposing side walls 32 and 33 and a bottom wall 34. The bottom wall 34 connects an end of each of the two side walls 32 and 33. In the drawing, double-headed arrow X1 indicates the direction in which the shell portion 31 extends.

The side walls 32 and 33 are flat. The side walls 32 and 33 are spaced apart from each other in a thickness direction of the side walls 32 and 33 and oppose each other in the thickness direction. That is, in the protector 22 of the present embodiment, an opposing direction X2 of the two side walls 32 and 33 coincides with the thickness direction of the side walls 32 and 33. The opposing direction X2 may differ between different parts of the shell portion 31 in accordance with the direction in which the shell portion 31 extends.

The bottom wall 34 is formed integrally with the side walls 32 and 33. The bottom wall 34 is belt-shaped. The side walls 32 and 33 respectively project from two widthwise ends of the bottom wall 34 in a thickness direction of the bottom wall 34. In the present embodiment, the shell portion 31 is bracket-shaped in a cross section extending in the opposing direction X2, or a cross section that is perpendicular to the direction in which the shell portion 31 extends. The side walls 32 and 33 and the bottom wall 34 define a groove-like electric wire accommodation portion 35 where the electric wires 21 are disposed in the shell portion 31.

As shown in FIG. 3, the electric wires 21 are accommodated in the electric wire accommodation portion 35 so that the shell portion 31 covers the outer side of the electric wires 21. The electric wires 21 are arranged in the electric wire accommodation portion 35 such that the longitudinal direction of the electric wires 21 is perpendicular to the opposing direction X2 and such that the electric wires 21 extend in the direction in which the shell portion 31 extends. A lid 51 is attached to the end of each of the side walls 32 and 33 that is opposite to the end connected to the bottom wall 34. The lid 51 covers the opening of the electric wire accommodation portion 35. The lid 51 is formed from resin. The lid 51 restricts separation of the electric wires 21 from the shell portion 31.

Structure of Protection Portion 41

Figure 5:
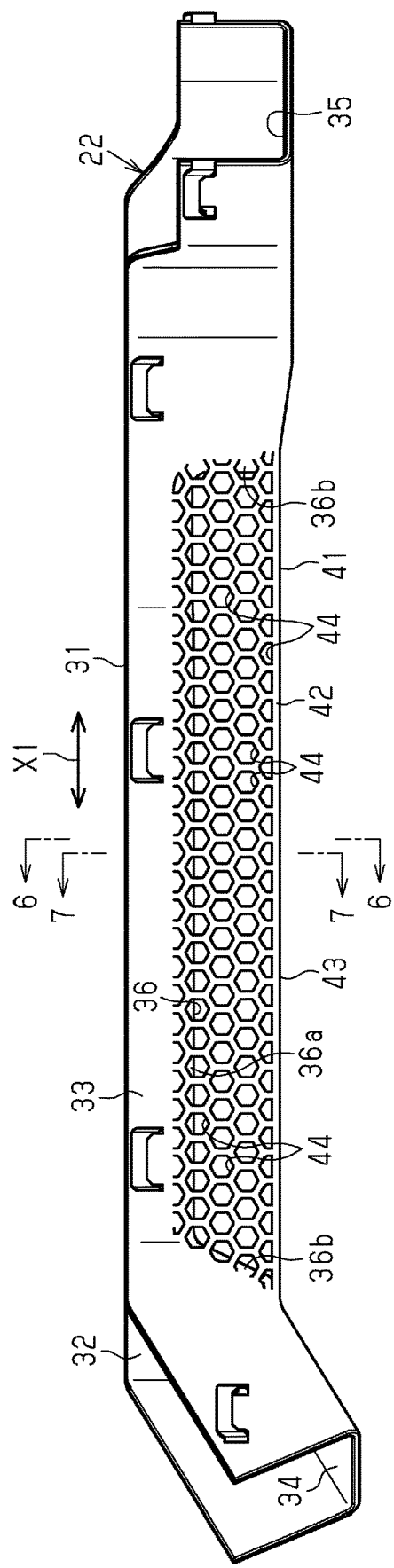
FIG. 5 is a front view of the protector in accordance with the embodiment.

As shown in FIG. 5, the protection portion 41 is integrated with an outer surface of the shell portion 31. The protection portion 41 of the present embodiment disperses and absorbs the impact applied by an object striking the protection portion 41.

Figure 8:
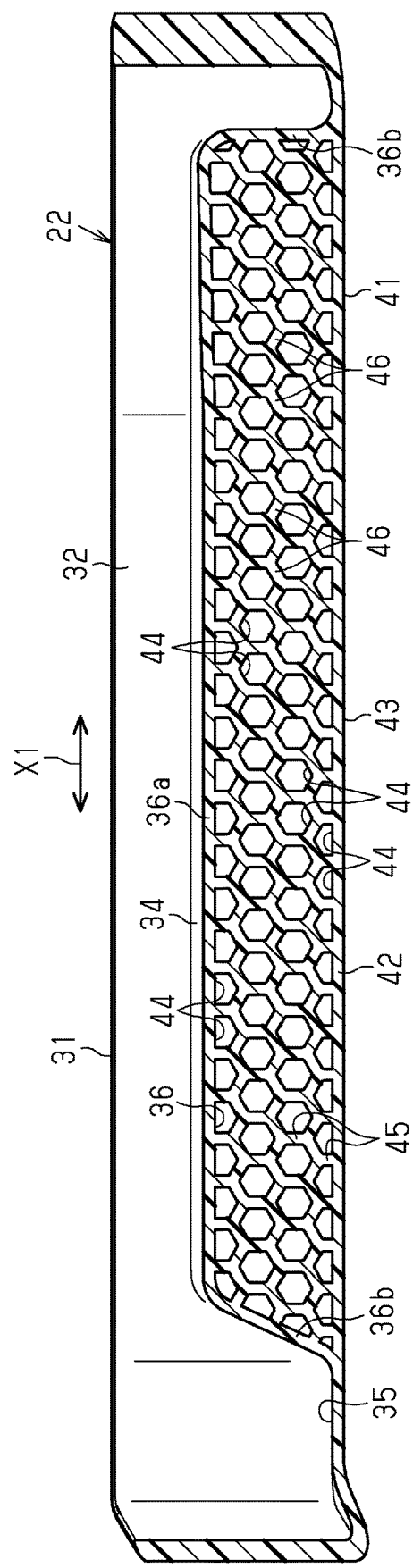
FIG. 8 is a cross-sectional view of the protector in accordance with the embodiment.

As shown in FIGS. 5 and 8, the protection portion 41 is formed integrally with an outer surface of the bottom wall 34. FIG. 8 is a cross-sectional view of the protector 22 taken at a central part of the bottom wall 34 in the widthwise direction along a plane that is perpendicular to the opposing direction X2. In FIGS. 5 and 8, the opposing direction X2 where the protection portion 41 is located in the shell portion 31 is perpendicular to the plane of the drawing. The bottom wall 34 includes a part that is recessed toward the inner side of the shell portion 31 as viewed in the opposing direction X2. Accordingly, the outer surface of the bottom wall 34 defines a protection recess 36. The protection portion 41 is arranged in the protection recess 36 and formed integrally with peripheral surfaces in the protection recess 36. Specifically, the protection portion 41 is formed integrally with a bottom 36a of the protection recess 36 that is part of the bottom wall 34. Further, the two ends of the protection portion 41 in the direction in which the shell portion 31 extends are formed integrally with two side walls 36b of the protection recess 36 in the direction in which the shell portion 31 extends.

Figure 6:
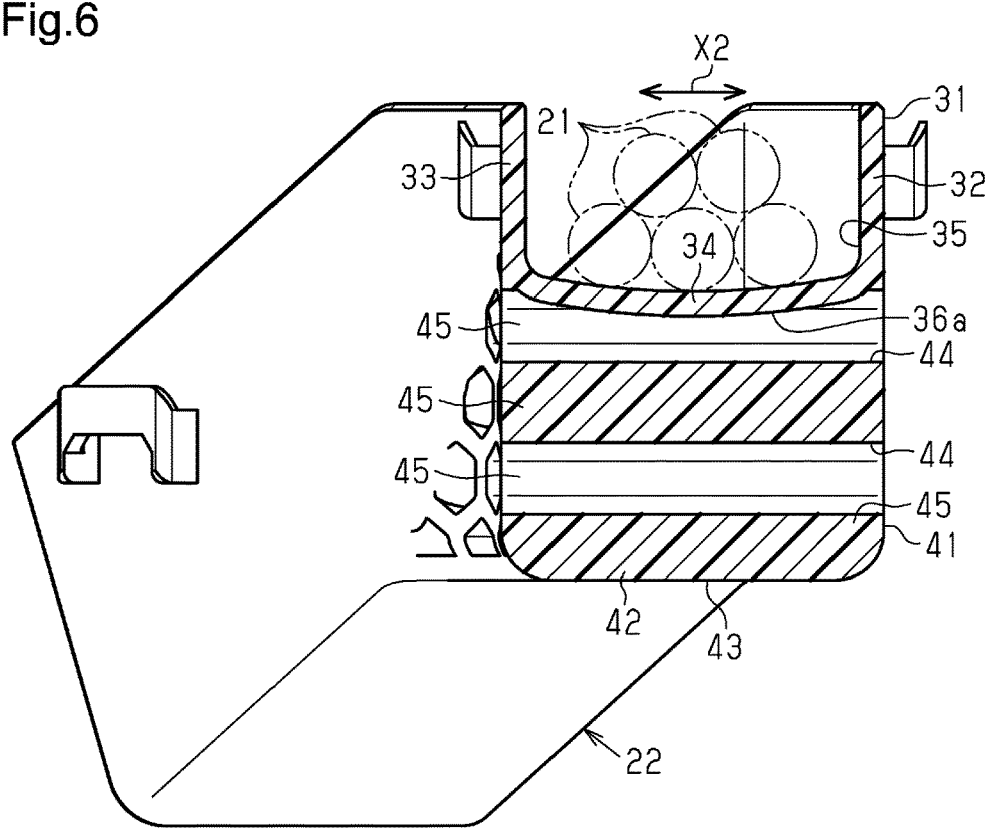
FIG. 6 is a cross-sectional view of the protector in accordance with the embodiment.
Figure 7:
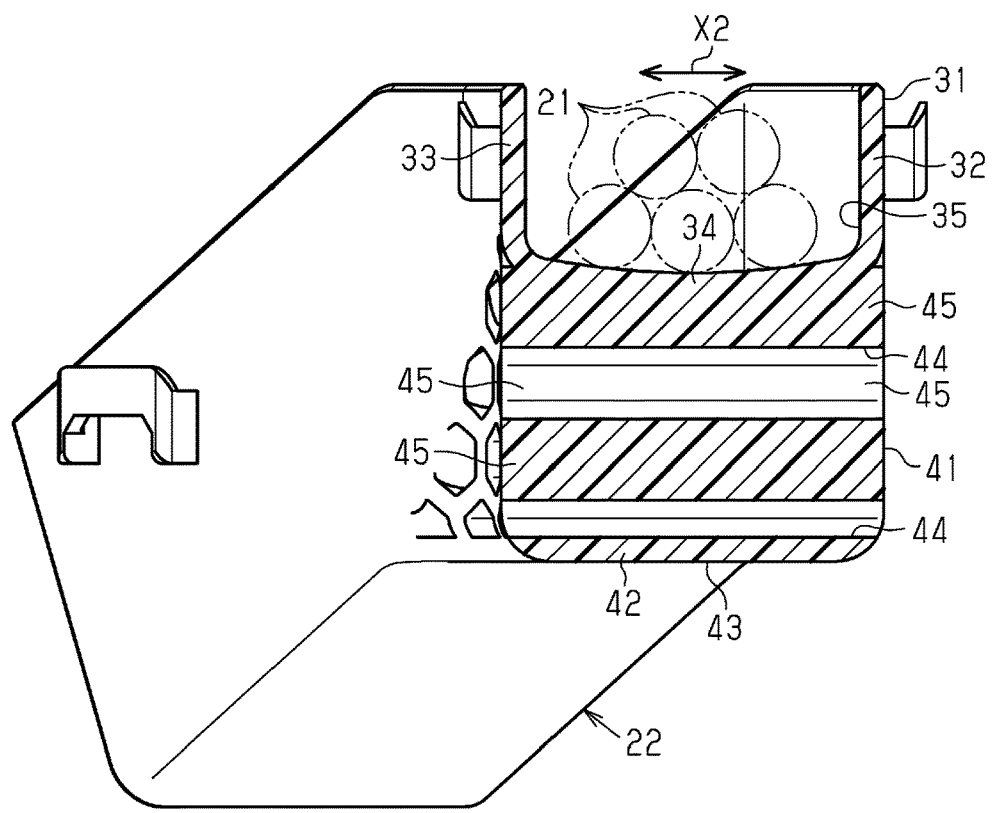
FIG. 7 is a cross-sectional view of the protector in accordance with the embodiment.

As shown in FIGS. 6 and 7, the bottom 36a is a part of the bottom wall 34 that is integrated with the protection portion 41. In a cross section that is perpendicular to the direction in which the shell portion 31 extends, the bottom 36a is curved in an arcuate manner and bulged toward the protection portion 41. In other words, in a cross section of the protector 22 that is perpendicular to the direction in which the shell portion 31 extends, the bottom 36a is arched and bulged toward the outer side of the shell portion 31.

The protection portion 41 includes an impact receiving wall 42 at an end in a direction perpendicular to the opposing direction X2 in the protection portion 41 and the direction in which the shell portion 31 extends. The impact receiving wall 42 is disposed at the side of the protection portion 41 opposite to the shell portion 31. The impact receiving wall 42 is flat. Further, the impact receiving wall 42 extends in a direction parallel to the direction in which the shell portion 31 extends. The outer surface of the impact receiving wall 42 defines an impact receiving surface 43. The impact receiving surface 43 faces a side opposite to the shell portion 31 and is exposed to the outside of the protector 22. The impact receiving surface 43 extends over a range of the protector 22 that expected to be vulnerable to a striking object. In the present embodiment, the impact receiving surface 43 faces the side opposite to the bottom 36a of the protection recess 36 in the protection portion 41. Further, the impact receiving surface 43 is exposed to the outside of the protector 22 over the open end of the protection recess 36 in a direction perpendicular to the opposing direction X2. The impact receiving surface 43 is flat. In the present embodiment, as viewed in the opposing direction X2, the impact receiving surface 43 extends in the opposing direction X2 and is parallel to the bottom 36a of the protection recess 36. Further, as viewed in the opposing direction X2, the impact receiving surface 43 extends parallel to the part of the shell portion 31 that is integrated with the protection portion 41. The protector 22 is arranged in the vehicle 10 with the impact receiving wall 42 facing the direction from which an object is expected to strike the protector 22.

As shown in FIGS. 5 to 8, the protection portion 41 includes the cells 44 extending parallel to one another. FIG. 6 is a cross-sectional view of the protector 22 taken along line 6-6 shown in FIG. 5 that is perpendicular to the direction in which the shell portion 31 extends. FIG. 7 is a cross-sectional view of the protector 22 taken along line 7-7 shown in FIG. 5 that is perpendicular to the direction in which the shell portion 31 extends. The cells 44 extend in the opposing direction X2 in the part where the protection portion 41 is formed integrally with the shell portion 31. Further, the cells 44 are arranged at regular intervals.

Figure 9:
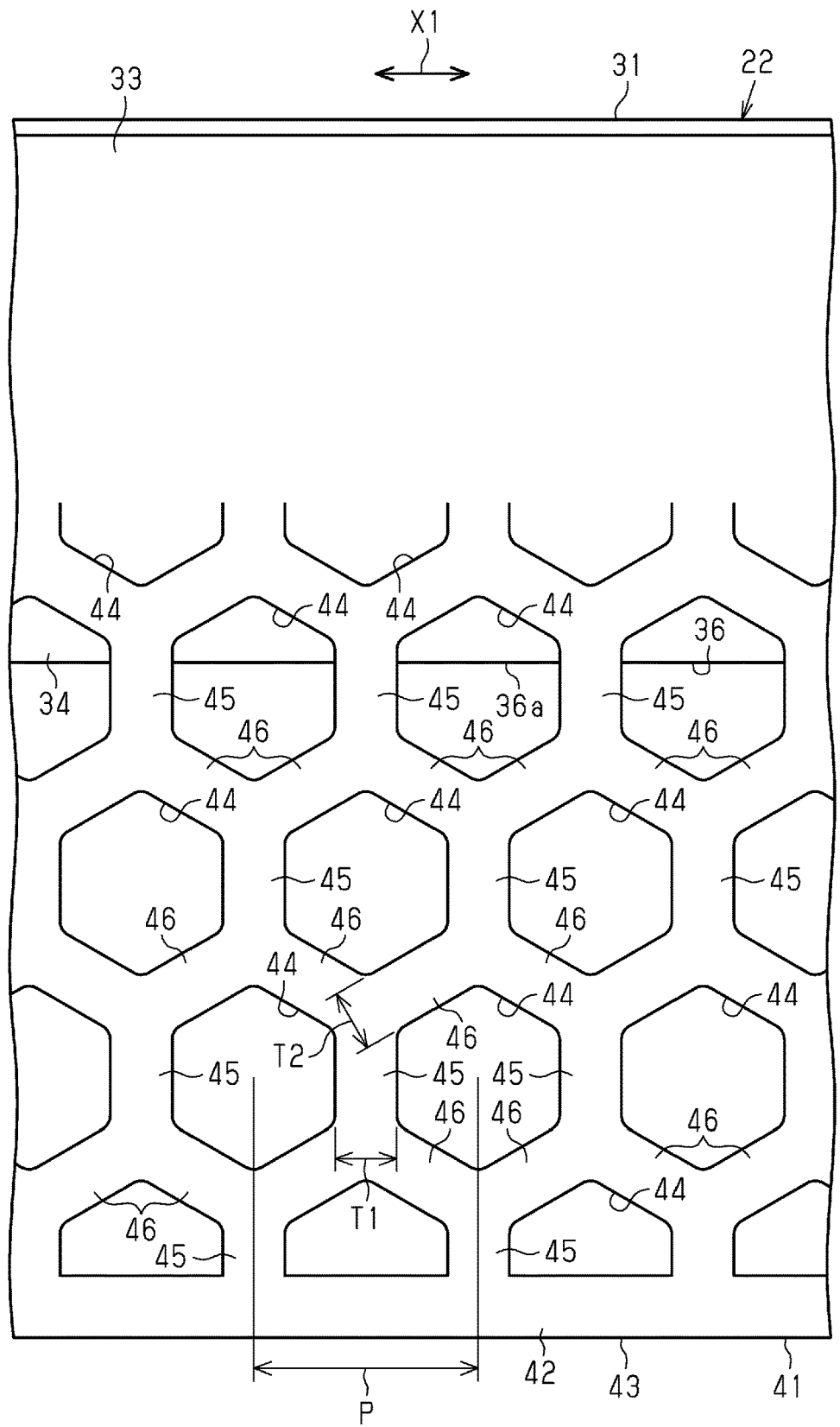
FIG. 9 is an enlarged view showing part of the protector in accordance with the embodiment.

As shown in FIG. 9, as viewed in the opposing direction X2, the cells 44 have the form of a regular hexagon. In FIG. 9, the opposing direction X2 is perpendicular to the plane of the drawing. Thus, the protection portion 41 has a honeycomb structure in which the cells 44 have the form of a regular hexagon. As viewed in the opposing direction X2, five rows of the cells 44, with the cells 44 of each row arranged next to one another in the direction in which the shell portion 31 extends, are formed between the impact receiving surface 43 and the bottom 36a of the protection recess 36. In FIG. 9, the cells 44 of each row are arranged adjacent to one another in a sideward direction that is parallel to the planar direction of the impact receiving surface 43. As viewed in the opposing direction X2, the cells 44 located at ends of the protection portion 41 may not have the shape of a complete regular hexagon and may have the shape of part of a regular hexagon. Further, the cells 44 located at the ends of the protection portion 41 may include ones extending in the opposing direction X2 that are not through holes depending on the forms of the bottom 36a and the side walls 36b of the protection recess 36.

The protection portion 41 includes first ribs 45 and second ribs 46 extending between adjacent cells 44. The first ribs 45 and the second ribs 46 are post-shaped and extend in the opposing direction X2. As viewed in the opposing direction X2, the first ribs 45 extend perpendicular to the impact receiving surface 43. Further, in the present embodiment, the first ribs 45 extend perpendicular to the bottom 36a of the protection recess 36 as viewed in the opposing direction X2. Two second ribs 46 branch off from each first rib 45, and each second rib 46 is tilted with respect to the first rib 45 as viewed in the opposing direction X2. Each cell 44 is defined by two first ribs 45 and four second ribs 46. Among the five rows of the cells 44, the first ribs 45 of the cells 44 in the first row from the impact receiving wall 42 are connected to and integrated with the impact receiving wall 42. The first ribs 45 and the second ribs 46 support the impact receiving wall 42 where an object is expected to strike.

In the present embodiment, the rib thickness T1 of the first rib 45 and the rib thickness T2 of the second rib 46 are set to be the same value. Further, the pitch P between adjacent cells 44 is set to be a greater value than the rib thickness T1, T2. A change in the rib thickness T1, T2 and the pitch P will result in a change in the cross-sectional area of the portion that supports the impact receiving wall 42, which receives the impact of a striking object. The cross-sectional area of the portion that supports the impact receiving wall 42 corresponds to the cross-sectional area of the protection portion 41 taken along a plane that is parallel to the impact receiving surface 43.

Preferably, the rib thickness T1, T2 is 1.5 mm or greater and 3.0 mm or less. Further preferably, the rib thickness T1, T2 is 1.5 mm or greater and 2.0 mm or less. Moreover, it is preferred that the pitch P be greater than the rib thickness T1, T2 and greater than or equal to 5 mm. Further preferably, the pitch P is greater than 7.0 mm and less than 9 mm.

Simulations were conducted with a protector including a protection portion of which the structure is the same as the protection portion 41 of the present embodiment. In the simulations, an impact having an expected force was applied from outside to the protectors having various rib thickness T1, T2 and pitch P. As a result, preferred combinations of the rib thickness T1, T2 and the pitch P were obtained as follows. For example, when the rib thickness T1, T2 is 1.5 mm, a preferred pitch P is 7.25 mm. When the rib thickness T1, T2 is 2.0 mm, a preferred pitch P is 7.25 mm. When the rib thickness T1, T2 is 2.5 mm, a preferred pitch P is 8.0 mm. When the rib thickness T1, T2 is 3.0 mm, a preferred pitch P is 8.75 mm.

Operation

The operation of the present embodiment will now be described.

When an object strikes the impact receiving surface 43, the impact is applied to the impact receiving surface 43 by the object. The impact receiving wall 42 disperses the impact with the first ribs 45 that are integrated with the impact receiving wall 42. Then, the impact dispersed with the first ribs 45 is transmitted through the first ribs 45 and the second ribs 46 in the protection portion 41, thereby dampening the impact. In this manner, the protection portion 41 disperses and absorbs the energy of the impact applied from the outside of the protector 22 to the impact receiving surface 43.

The present embodiment has the following advantages.

(1) The protector 22 includes the shell portion 31 and the protection portion 41. The shell portion 31 is formed from resin and covers the outer side of the electric wires 21. The protection portion 41 dampens the impact applied from outside the protector 22. The protection portion 41 is formed from resin and formed integrally with the shell portion 31.

With the above structure, the protection portion 41 dampens the impact applied to the protection portion 41 by an object striking the protection portion 41. This dampens the impact received by the electric wires 21. Further, the shell portion 31 is formed integrally with the protection portion 41. Thus, the protector 22 has fewer parts than a protector in which a shell portion and a protection portion are separate parts. This improves assembling workability of the wire harness 20. Also, the manufacturing costs are reduced as compared with when a protection material is wrapped around the electric wires and disposed in a shell portion with the electric wires to protect the electric wires from an impact.

(2) The protection portion 41 includes the cells 44 extending parallel to one another. Accordingly, the electric wires 21 receive the impact dampened by the protection portion 41 including the cells 44 that extend parallel to one another. Thus, the protection portion 41 that has a simple structure dampens the impact received by the electric wires 21.

(3) The protection portion 41 disperses and absorbs the impact applied to the protection portion 41. The protection portion 41 disperses and absorbs the impact applied from outside the protector 22 and dampens the impact received by the electric wires 21. The protection portion 41 dampens the impact on the electric wires 21 without increasing the protection portion in size or using an expensive resin material in the protection portion.

(4) The shell portion 31 is gutter-shaped and includes the two opposing side walls 32 and 33 and the bottom wall 34. The bottom wall 34 connects the end of each of the two side walls 32 and 33. The protection portion 41 is integrated with the outer surface of the bottom wall 34. The cells 44 extend in the opposing direction X2 of the two side walls 32 and 33.

The above structure limits the length of the cells 44 as compared with when the cells extend in the direction in which the shell portion 31 extends. This facilitates manufacture of the protector 22 with a mold.

(5) The protection portion 41 has a honeycomb structure in which the cells 44 are hexagonal. Thus, the protection portion 41 further effectively dampens an impact.

(6) The part of the bottom wall 34 that is integrated with the protection portion 41 is curved in an arcuate manner and bulged toward the protection portion 41 in a cross section that is perpendicular to the direction in which the shell portion 31 extends. In the present embodiment, the bottom 36*a* of the protection recess 36 is arched and bulged toward the outer side of the shell portion 31 in a cross section that is perpendicular to the direction in which the shell portion 31 extends. This allows the protector 22 to withstand a larger impact applied from the outside of the protector 22 to the protection portion 41 than when the part of the bottom wall 34 integrated with the protection portion 41 extends straight in a cross section that is perpendicular to the direction in which the shell portion 31 extends.

(7) The protection portion 41 is integrated with a part of the outer surface of the shell portion 31. The protection portion 41 includes a flat side surface facing a side opposite to the shell portion 31 and exposed to the outside of the protector 22. Accordingly, when an object strikes the side surface of the protection portion 41, which is located at the side opposite to the shell portion 31, the force of the object will be applied to the protection portion 41 in a direction perpendicular to the side surface.

In the present embodiment, the impact receiving surface 43 corresponds to the side surface of the protection portion 41 that faces the side opposite to the shell portion 31 and is exposed to the outside of the protector 22. As viewed in the opposing direction X2, the impact receiving surface 43 is flat and extends parallel to the bottom 36*a* in the direction in which the shell portion 31 extends. Further, as viewed in the opposing direction X2, the first ribs 45 are perpendicular to the impact receiving surface 43. Therefore, when an object strikes the impact receiving surface 43, the force of the object will be applied to the protection portion 41 in a direction parallel to the first rib 45 as viewed in the opposing direction X2. In this manner, the protection portion 41 effectively disperses and dampens the impact received by the electric wires 21.

(8) The wire harness 20 includes the electric wire 21 and the protector 22. The electric wire 21 is connected to the battery 13 that drives the power source for moving the vehicle. The protector 22 includes the shell portion 31 that covers the outer side of the electric wire 21. With this structure, the electric wire 21 is connected to the battery 13 that drives the power source for moving the vehicle. Thus, a high voltage may be applied to the electric wire 21. In the wire harness 20, the protector 22 dampens the impact received by such an electric wire 21.

(9) When the rib thickness T1 of the first ribs 45 and the rib thickness T2 of the second rib 46 are set to 1.5 mm or greater and 2.0 mm or less, the protector 22 is easily formed with a mold. This facilitates mass-production of the protector 22.

(10) The protector 22 of the present embodiment has a structure in which the protection portion 41, which dampens an impact applied from outside the protector 22, is formed integrally with the shell portion 31, which covers the outer side of the electric wires 21. Accordingly, depending on the resin material for the protector 22, the structure of the present embodiment may reduce costs when compared to a conventional structure in which a protection member, which protects the electric wire from an impact applied from outside the protection member, is formed separately from a shell member, which covers the electric wire.

The present embodiment may be modified as follows. The present embodiment and the following modifications can be combined as long as the combined modifications remain technically consistent with each other.

In the above embodiment, as viewed in the opposing direction X2, the protection portion 41 includes five rows of the cells 44 between the impact receiving surface 43 and the bottom 36*a* of the protection recess 36. The cells 44 are arranged adjacent to one another in the direction in which the shell portion 31 extends. However, the number of the rows of the cells 44 does not have to be five and may be four or less or six or greater as viewed in the opposing direction X2. Preferably, there is more than one row of the cells 44 arranged next to one another in the direction in which the shell portion 31 extends between the impact receiving surface 43 and the bottom 36a of the protection recess 36 as viewed in the opposing direction X2. In this way, the impact applied from outside to the protection portion 41 is absorbed more effectively by the protection portion 41 as compared with when only one row is formed. This further dampens the impact received by the electric wires 21.

In the above embodiment, the impact receiving surface 43, that is, the side surface of the protection portion 41, which faces the side opposite to the shell portion 31 and is exposed to the outside, is flat. However, the impact receiving surface 43 does not necessarily have to be a flat and may be, for example, curved or stepped.

In the above embodiment, the bottom 36a of the protection recess 36 is arched and bulged toward the outer side of the shell portion 31 in a cross section that is perpendicular to the direction in which the shell portion 31 extends. However, the part of the bottom wall 34 integrated with the protection portion 41 does not have to be shaped in such a manner and may be flat or the like.

In the above embodiment, the shell portion 31 is bracket-shaped in a cross section that is perpendicular to the direction in which the shell portion 31 extends. However, the shell portion 31 only needs to include two side walls and a bottom wall that connects the ends of the two side walls. For example, the shell portion 31 may be U-shaped, arched, or annular in a cross section that is perpendicular to the direction in which the shell portion 31 extends. Alternatively, the shell portion 31 does not necessarily have to include two side walls and a bottom wall that connects the end of each of the two side walls as long as the shell portion 31 covers the outer side of the electric wires 21. For example, the shell portion 31 may be L-shaped in a cross section that is perpendicular to the direction in which the shell portion 31 extends.

The rib thickness T1 of the first rib 45 may be different from the rib thickness T2 of the second rib 46. Further, the rib thickness T1, T2 and the pitch P do not have to be set to the value indicated in the above embodiment and may be varied as required by the specification of the wire harness 20.

As viewed in the opposing direction X2, the cells 44 may have a hexagonal shape that is not a regular hexagon.

In the above embodiment, the protection portion 41 has a honeycomb structure. However, the protection portion 41 does not necessarily have to have a honeycomb structure. For example, the cells 44 may be circular, semicircular, elliptic, or have a polygonal shape that is not a regular hexagon as viewed in the opposing direction X2. Further, the cells 44 may be arranged at irregular intervals.

In the above embodiment, the cells 44 extend in the protection portion 41 in the opposing direction X2. However, the cells 44 may extend in the protection portion 41 in a different direction. For example, the cells 44 may extend in a direction that is perpendicular to both the opposing direction X2 and the direction in which the shell portion 31 extends. Alternatively, the cells 44 may extend in the direction in which the shell portion 31 extends.

In the above embodiment, the protection portion 41 disperses and absorbs the impact applied to the protection portion 41. Alternatively, instead of positively dispersing an impact, the protection portion 41 may be increased in rigidity to withstand and dampen the impact applied from outside the protector to the electric wires 21.

In the above embodiment, the material of the protector 22 is, for example, polyamide. However, the material of the protector 22 is not limited to polyamide and may be any resin.

In the above embodiment, five electric wires 21 are covered by the shell portion 31. However, one will be sufficient as the number of the electric wires 21 covered by the shell portion 31.

In the above embodiment, the wire harness 20 is laid out under the floor or the like of the vehicle 10. However, the wire harness 20 may be arranged at a different location in the vehicle 10 in accordance with where the wire harness 20 is connected to the electric component 11. Further, the protector 22 may be changed in position and orientation in the vehicle 10 according to the arrangement of the wire harness 20.

In the above embodiment, the wire harness 20 connects the electric components 11, namely, the inverter 12 and the battery 13. However, the electric components 11 connected by the wire harness 20 are not limited and may be any electric components 11 installed in the vehicle 10. The electric components 11 include a controller and the like. In this manner, the wire harness according to the present disclosure is not limited to a high-voltage harness and may also be a low-voltage harness.

The present disclosure includes the following examples. Reference numerals of the components of the embodiment are given to facilitate understanding and not to limit the scope of the invention.

Embodiment 1

A protector (22) in accordance with an example of the present disclosure may be a protector (22) that is formed from a resin and covers one or more electric wires (21), the protector (22) including:
- a first end and a second end in a longitudinal direction (X1) of the protector (22);
- an electric wire accommodation portion (35) extending from the first end to the second end and defining an open space to accommodate the one or more electric wires;
- a protection portion (41) arranged between the first end and the second end; and a partition wall (bottom wall 34) extending in the longitudinal direction (X1) to partition the electric wire accommodation portion (35) and the protection portion (41).

Embodiment 2

In one or more examples of the present disclosure, the electric wire accommodation portion (35) may be gutter-shaped and be open in a direction opposite to the partition wall, and the protector (22) may further include a lid (51) that covers the opening.

Embodiment 3

In one or more examples of the present disclosure, each of the first end and the second end may be an open end, and the protection portion 41 (41) may be separated from the first end and the second end.

Embodiment 4

In the one or more examples of the present disclosure, the protection portion (41) may have a honeycomb structure.

Embodiment 5

In the one or more examples of the present disclosure, the protection portion (41) may include through cells (44) extending through the protector (22) in a widthwise direction.

Embodiment 6

In the one or more examples of the present disclosure, the protection portion (41) may include a flat outer wall (impact receiving wall 42) defining an outer surface of the protector (22).

Embodiment 7

In the one or more examples of the present disclosure, the protector (22) may be bent at one or more locations in the longitudinal direction (X1).

Embodiment 8

In the one or more examples of the present disclosure, the protection portion (41) may have a dimension that is greater than a dimension of the electric wire accommodation portion (35) in a thickness-wise direction of the protector (22).

Embodiment 9

In the one or more examples of the present disclosure, the partition wall (34) may be curved in an arcuate manner in a cross section taken along a plane intersecting the longitudinal direction (X1) to increase a volume of the electric wire accommodation portion (35).

REFERENCE SIGNS LIST 10 vehicle
11 electric device
12 inverter
13 battery (electric power supply)
20 wire harness
21 electric wire
22 protector
31 shell portion
32 side wall
33 side wall
34 bottom wall
35 electric wire accommodation portion
36 protection recess
36a bottom
36b side wall
41 protection portion
42 impact receiving wall
43 impact receiving surface
44 cell
45 first rib
46 second rib
51 lid
T1 rib thickness
T2 rib thickness
P pitch
X1 shell-portion extending direction
X2 opposing direction

The invention claimed is:

1. A protector, comprising:
a shell portion that is formed from a resin and covers an outer side of an electric wire; and
a protection portion that dampens an impact applied from outside the protector, wherein
the protection portion is formed from a resin and formed integrally with the shell portion,
the shell portion is gutter-shaped and includes two opposing side walls in a width direction and a bottom wall connecting an end of each of the two side walls,
the bottom wall has a protection recess recessed toward the inside of the shell portion,
the protection portion is arranged in the protection recess and formed integrally with peripheral surfaces in the protection recess,
the protection portion includes cells extending parallel to one another, and
the cells are through holes extending through the protection portion in the width direction.

2. The protector according to claim 1, wherein the protection portion disperses and absorbs the impact applied to the protection portion.

3. The protector according to claim 1, wherein the protection portion has a honeycomb structure in which the cells are hexagonal.

4. The protector according to claim 1, wherein
the protection portion is formed integrally with a bottom of the protection recess that is part of the bottom wall, and
a part of the bottom wall that is integrated with the protection portion is curved in an arcuate manner and bulged toward the protection portion in a cross section that is perpendicular to a direction in which the shell portion extends.

5. The protector according to claim 1, wherein
the protection portion is integrated with a part of an outer surface of the shell portion, and
the protection portion includes a flat side surface facing a side opposite to the shell portion and exposed to the outside.

6. A wire harness, comprising:
an electric wire electrically connected to an electric power supply that drives a power source for moving a vehicle; and
the protector according to claim 1, including the shell portion that covers the outer side of the electric wire.

* * * * *